Aug. 21, 1956     E. B. PAILLE     2,759,710
COOLING DEVICE

Filed July 3, 1953     3 Sheets-Sheet 1

INVENTOR.
EDWARD B. PAILLE
BY
*James E. Toomey*
ATTORNEY

INVENTOR.
EDWARD B. PAILLE
BY James E. Tooney
ATTORNEY

Aug. 21, 1956     E. B. PAILLE     2,759,710
COOLING DEVICE

Filed July 3, 1953     3 Sheets-Sheet 3

INVENTOR.
EDWARD B. PAILLE
BY
*James E. Toomey*
ATTORNEY

United States Patent Office 2,759,710
Patented Aug. 21, 1956

2,759,710

COOLING DEVICE

Edward B. Paille, Baton Rouge, La., assignor to Kaiser Aluminum & Chemical Corporation, Oakland, Calif., a corporation of Delaware Application July 3, 1953, Serial No. 365,957

4 Claims. (Cl. 257—240)

This invention relates to a novel method and apparatus for treating fluidized materials. More particularly, it is concerned with providing a novel method and apparatus for both fluidizing pulverulent materials and for effecting a satisfactory transfer of heat between the pulverulent materials and a heat transferring surface while the materials are maintained in the fluidized state.

It is well established that a body of finely divided solids behaves as a fluid when continuously aerated, and the essence of fluidizing solids involves the suspension of finely divided solid particles within a rising stream of gas. The gas separates and supports the particles and provides mobility and solidity for the mass of suspended particles.

Attempts have also been made in the past to bring about both direct and indirect heat transfer simultaneously in fluidized beds of solids during the period of gaseous suspension of the same. The direct heat transfer between the gas itself and finely divided suspended particles is extremely rapid because of the enormous solid surface available. Furthermore, the transfer of heat throughout and from the fluidized solid bed is almost instantaneous because of the extremely rapid rate of circulation of solid particles throughout the bed. In addition, when a metal heat transfer surface is located in the path of a moving bed or body of fluidized material, the indirect transfer of heat between the fluidized solid's bed and the metal heat transfer surface is at a very high rate, because of the transfer of heat by conduction between the suspended particles and the metal wall or walls of the heat transferring surface during the innumerable contacts of the particles with the wall or walls of the heat transferring surface.

The use, however, of the fluidized solids technique as a suitable medium within which to effect both direct and indirect heat transfer has not always been completely satisfactory. Among the reasons for this was the fact that the devices employed for such purposes had to be of a very large size in order to have the volumetric capacity needed for effecting the proper and requisite amount of heat transfer. Consequently, they usually involved very complicated and numerous parts which increased the likelihood of mechanical failures and inefficient operation of the devices, in addition to taking up a large amount of valuable space within a processing plant. As a result, the various apparatus and methods employed for effecting heat transfer in a fluidized body were not always practical.

Furthermore, the apparatus and methods heretofore proposed for effecting heat transfer in a bed of fluidized solids did not always provide for effective control of possible short circuiting of the solids during the heat transferring operation, with the result that the maximum amount of efficiency was lacking in the apparatus and/or method proposed.

It is a primary object of this invention to provide a novel and efficient method and apparatus for effecting a satisfactory heat transfer between a bed of fluidized solids and a heat transferring surface.

It is another object of this invention to provide a novel method and apparatus for efficiently cooling a fluidized body of material.

Another object of this invention is to provide a novel compact apparatus comprised of a minimum amount of parts which can be used as an efficient device for transferring heat between the fluidized solid's bed and one or more metal heat transfer surfaces such as heat exchanger tubes.

Another object of this invention is to provide a novel efficient method for transferring heat between a fluidized solid's bed and a metal heat transfer surface wherein the maximum amount of heat can be extracted from a fluidized bed of solids in a minimum amount of time.

Another object of this invention is to provide a novel method and apparatus for bringing about heat transfer between the fluid solid's bed and a metal heat transfer surface wherein short circuiting of the material during the heat transfer operation is reduced to a minimum.

Another object of this invention is to provide a novel method and apparatus for effecting heat exchange between a body or bed of fluidized solids and a heat transferring surface, wherein the heat exchange is effected both directly and indirectly as the body of fluidized material is made to traverse a tortuous path through a closed chamber or receptacle.

These and other objects and advantages are accomplished by providing in one advantageous embodiment of the invention an apparatus for use in effecting heat transfer in a fluidized body of material, which comprises the combination of a receptacle provided with an inlet and an outlet. Suitable means are located in the bottom of the receptacle for injecting a fluidizing gas into the body of material, which is deposited within the receptacle, and for causing the material to flow from the inlet to the outlet of the receptacle. A plurality of baffles are disposed in spaced relationship to one another within the receptacle. These serve to effectively divide the interior of the receptacle into a plurality of successive compartments. Each of the baffles have suitable spaced openings or cutaway portions at different ends thereof, whereby the successively formed compartments are brought into open communication with each other and a tortuous passage is formed in the receptacle extending from the inlet to the outlet of the receptacle. Finally, separate indirect heat transfer media, such as heat exchanger tubes, are disposed in the form of bundles within each of the compartments of the receptacle parallel to the path of flow of the body of fluidized material and in such a way that they are adapted to be contacted by the body of fluidized material as it passes through the receptacle from the inlet to the outlet, without at the same time seriously interfering with or impeding the normal flow of body of fluidized material through the receptacle.

Other objects and advantages of the instant invention will become more apparent from a review of the following detailed description when taken in conjunction with the appended drawings wherein.

Figure 1:
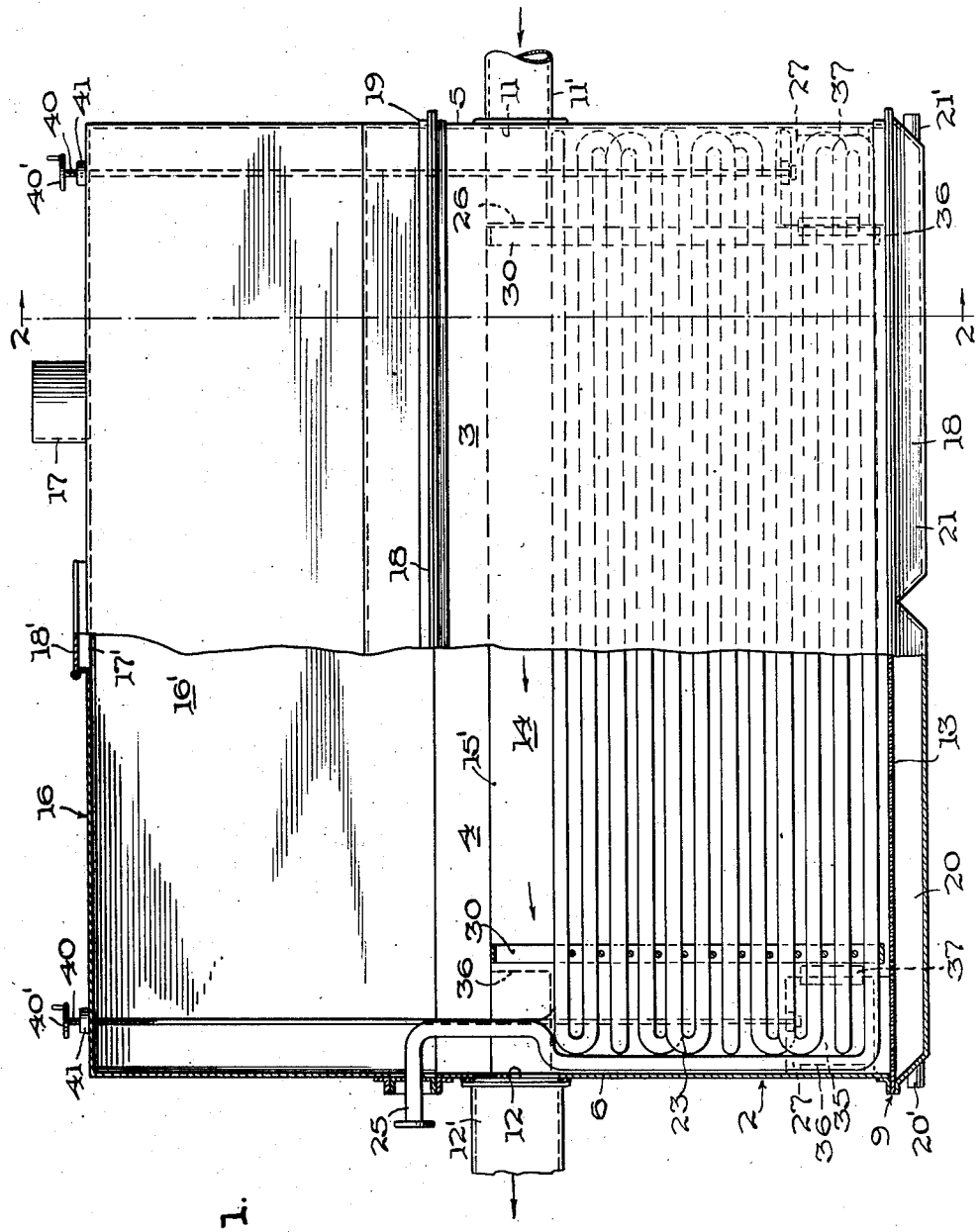
Figure 1 is a side elevational view with parts broken away of one suitable type of apparatus which can be employed for carrying out the instant invention.

In an advantageous embodiment of the invention the apparatus for carrying out heat exchange in a fluidized body of material may be comprised of a receptacle 2 of more or less rectangular configuration. Receptacle 2 is provided with side walls 3 and 4 and end walls 5 and 6. End wall 5 of receptacle 2 is provided at the upper portion thereof and adjacent side wall 4 with an inlet or opening 11 for the material which is to be fluidized and subjected to heat exchange, such as for example, calcined alumina. To provide for removal of the material after it has been fluidized and subjected to heat transfer from receptacle 2, another opening or outlet 12 is located in the opposing end wall 6. Outlet 12 is also located adjacent side wall 3 and slightly below the level of inlet 11 so as to permit proper flow of fluidized material from the inlet opening 11 to the outlet opening 12. It is to be understood that suitable feeding and discharge conduits 11' and 12' are affixed to the inlet and outlets 11 and 12 respectively, whereby a continuous flow can be effected through receptacle 2 of the material being treated. The base or bottom portion 9 of the receptacle includes a perforated metal plate 13, the function of which will be described more fully later. The interior of the receptacle 2 is effectively divided into a plurality of successive compartments 14 by means of the dividing plates or baffles 15 and 15'. For the purposes of illustration, two such plates are shown, although it is to be understood that any number can be employed, depending on the results desired. In dividing the interior of the receptacle 2 into a plurality of separate compartments, a single tortuous passage of substantial length is provided in the receptacle from the inlet end of receptacle 2 to the outlet end.

Each of the baffle plates 15 and 15' at one of the ends thereof is provided with a pair of spaced cutaway portions 26 and 27. Cutaway portion 26 is located at the top of each baffle and serves as a weir, and cutaway portion 27 is located at the bottom of each baffle. By means of these cutaway portions, open communication is provided for between each of the chambers or compartments 14. It is also to be understood that the material to be treated is introduced into the receptacle at such a rate that the body of material in the several compartments will be slightly below the tops of the several baffle members. In order also that a tortuous passage may be effected in receptacle 2, the end of baffle 15 containing cutaway portions 26 and 27 is located adjacent end wall 6, while the end of baffle 15' which is provided with similar cutaway portions 26 and 27 is located adjacent end wall 5. The function of these cutaway portions will be more fully described later.

Figure 2:
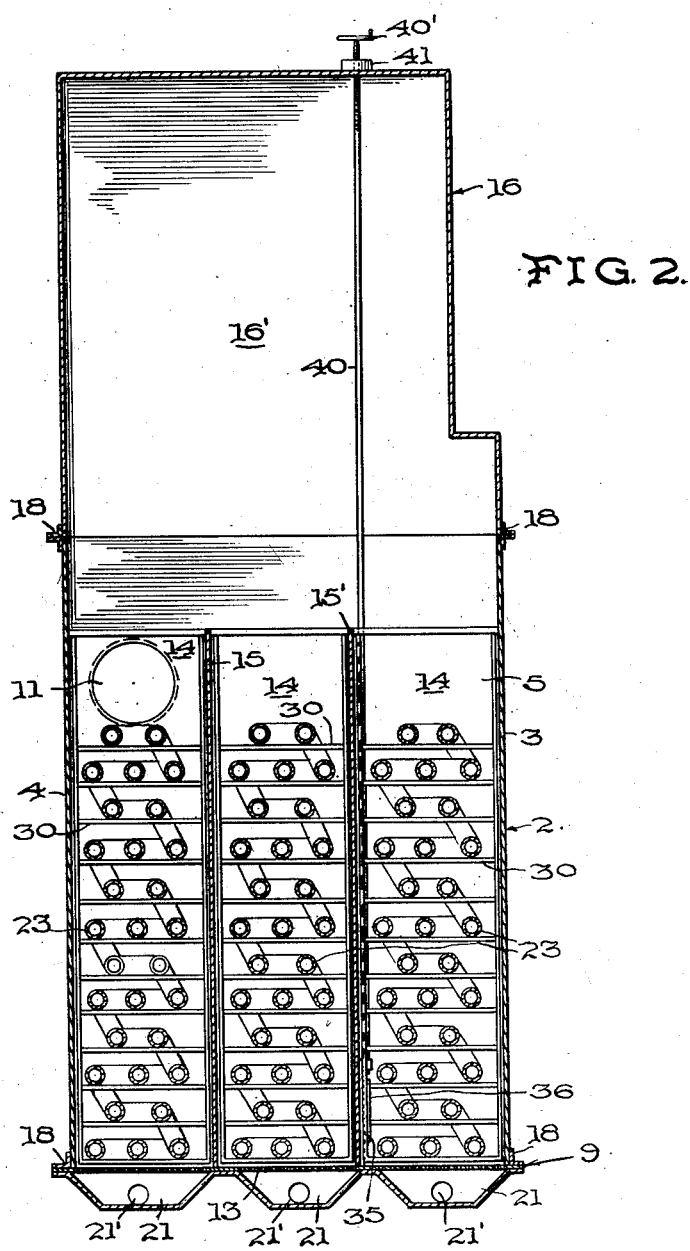
Figure 2 is a sectional view of the apparatus shown in Figure 1, when taken along line 2—2 thereof.
Figure 3:
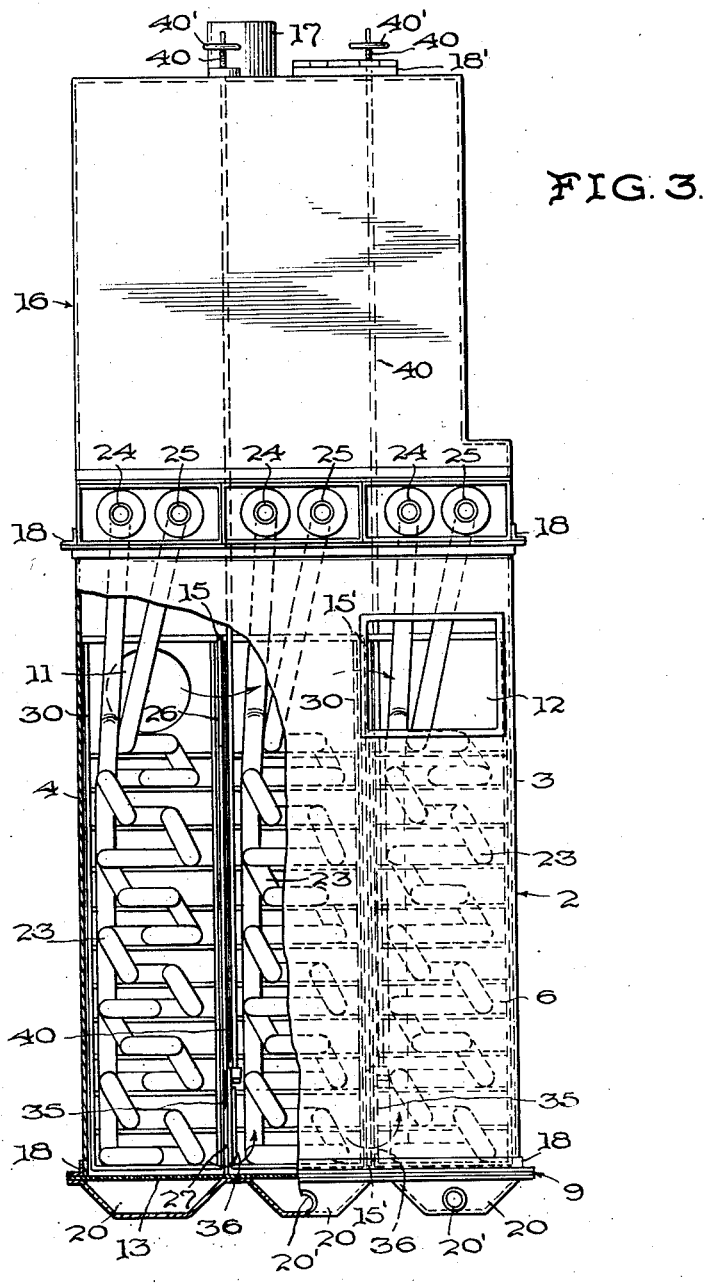
Figure 3 is an end elevational view of the apparatus shown in Figure 1 with parts broken away.

It will also be noted by referring to Figures 1 and 2 that the baffles 15 do not extend for substantially the entire height of the receptacle and in an advantageous embodiment of the invention, a hood 16 may be placed upon the top of the receptacle. This hood provides a chamber 16' at the top of the receptacle from which the spent gases employed for the purposes of aerating or fluidizing the solids in the receptacle 2 are collected and discharged through exhaust 17. In order that access may be had to the interior of receptacle 2 from above, whenever it is desirable, a manhole 17' and a cover 18' is also located in the top surface portion of hood 16.

It is also to be understood that suitable bracing members such as the longitudinal angles 18 and the lateral angle members 19 may also be employed for reinforcing the receptacle.

In the preferred embodiment of the invention it is contemplated that the bottom of the receptacle 2 below the perforated metallic plate 13 be divided up into a plurality of plenum chambers. Thus, for each compartment 14, there will be at least two plenum chambers 20 and 21, from which the gaseous material used to fluidize the pulverulent material in the receptacle can be injected into the chamber. By utilizing a plurality of plenum chambers, the gas velocity or pressure for various sections of each of the chambers 14 forming the tortuous passage through the receptacle may be independently and selectively controlled. As a result, different gas velocities may be set up in the different compartments, if necessary, to maintain uniform fluidization throughout the tortuous passage in the receptacle.

Air or any suitable type of gas for the purposes of fluidizing the material in the receptacle is introduced into the series of plenum chambers 20 and 21 through the intake pipes 20' and 21' respectively, these pipes being connected to a suitable source of supply (not shown).

Also located within each of the several compartments 14 and for substantially the entire length thereof, is a separate bundle or bank of tubular members 23 through which a cooling liquid such as water is circulated. The water is introduced under pressure through the inlet tube 24 located at the top of a bank of tubes and is discharged through the outlet 25 also located at the top of the tube bank. The inlet and outlet tubes 24 and 25 of each bank of tubes are separately connected to different manifold pipes (not shown). As a result, the coolant flowing through a bundle of tubes in a bank 23 in one compartment 14 can be controlled independently of the coolant flowing through the other bundles of tubes in the other compartments 14.

In order to support the several bundles of tubes 23 within the various chambers 14, suitable ladder type tube racks 30 are employed. Two tube racks are used for each of the chambers 14 and they are disposed at opposite ends of the chambers.

As the material, such as calcined alumina, is introduced through the inlet opening 11 in the receptacle 2, the gas being ejected from the plenum chambers 20 and 21 in the bottom of the first compartment passes through the perforated metal plate 13 and serves to aerate and fluidize the material. At the same time the body of calcined alumina is entered into the first compartment 14, it is also brought into contact with the first bundle of tubular members 23, which extend substantially from the bottom of the compartment to the top thereof and thus passes through the first stage of heat exchange operation. As the body of fluidized material contacts the bundle of tubes 23 within which a cooling fluid, such as water, is circulated, the water being introduced into the tube bundle substantially at room temperature, indirect heat transfer is effected between the body of fluidized material and the tubes making up the bundle of tubes. At the same time, direct heat transfer is effected between the fluidized body of material and the fluidizing gas flowing from the several plenum chambers 20 and 21 also at room temperature. The same action takes place in each succeeding chamber or compartment 14 until the fluidized material is progressively cooled the desired amount, after which it is finally evacuated from the receptacle through opening 12.

An adequate volume of gas is supplied to each of the chambers 14 to provide the proper amount of fluidity and head of material needed so that it will flow through the several weirs or upper cutaway portions 26 in the baffles 15 and 15' as well as through the lower cutaway portions 27 in the several baffles 15 and 15'.

It is to be noted that the use of the lower cutaway portions 27 in the several baffles 15 and 15' has been found highly advantageous in minimizing short circuiting of the material under treatment from one chamber to the other by providing an insured flow path from the top to the bottom of each chamber. In addition, it also insures that coarse grains of material which may settle to the bottom of the receptacle 2 as a result of possible stratification during the fluidization process, will also be effectively treated and forced along the tortuous passage from the inlet 11 to the outlet 12 of the receptacle. Finally, it permits the fluidized material to flow from one chamber to another with a minimum amount of pressure drop in the several compartments. The use of a tortuous passage which is brought about by the use of baffle plates 15 and 15' results in a restricted passage of flow for the fluidized body so that the greatest amount of exposure of the fluidized body to the tube bundles located parallel to the path of flow is accomplished.

As indicated above, the use of a plurality of gas plenum chambers provides for more effective control of the fluidization of the material. It is also within the contemplation of the invention that instead of using a perforated metallic plate, that other types of permeable mediums can also be used such as filtrous blocks, etc. as aerating devices. In addition, the gas apertures or openings in the permeable medium are preferably arranged vertically so that the gas will travel perpendicularly or normally to the general direction of movement of the bed. As a result, notwithstanding its high velocity, the gas will be evenly and uniformly distributed throughout the various compartments so that it will be diffused through the material at the proper pressure and without causing entrainment or channeling of the material.

In order to provide for the utmost efficiency in the flow of fluidized material from one chamber to another, it is also within the contemplation of this invention that suitable means be employed for adjusting the various openings or cutaway portions 27 located at the bottom of the several baffles 15 and 15'. To do this, suitable slide gates 35 are employed which are mounted within the keyway elements 36 and 37 located at either side of the cutaway portions. Each of these slide gates is connected to and is operated by a threaded rod 40. The rod 40 extends upwardly into the discharge chamber 16' for the effluent gases and is attached and supported on hood 16 by the threaded lug 41. These rods 40 are operated by the handwheels 40'.

In this way, it is possible to control the size of the opening 27 at one end and the bottom of each baffle and thereby obtain accurate control of the flow of material from one chamber into the other during the period that the fluidized bed moves along the tortuous path formed by the several baffle members.

When the body of pulverulent material treated is calcined alumina and it is introduced directly from another processing device such as a kiln into the fluidized cooling device of the instant invention, it has been found that the fluidized cooling device of the instant invention progressively and effectively reduces the heat intensity of the material to a point where it can be easily handled by other processing apparatus. In an advantageous embodiment of the invention, the greatest amount of heat transfer takes place in the first compartment or zone and smaller amounts of heat transfer take place in the remaining compartments or zones.

For example, in one run of calcined alumina, the material was introduced into the receptacle 2 at a temperature of 900° F. This was reduced in the first fluidizing chamber to 480° F. In the second chamber it was further reduced to approximately 295° F., and in the third chamber to 200° F. All during this operation, the water introduced into the separate tube bundles as well as the air introduced into the several fluidizing compartments was substantially at room temperature. In short, by means of the apparatus of the instant invention, it has been found that an effective heat transfer device can be had without the use of special cooling liquids or gases, since the maximum amount of exposure of the heated material to heat transferring mediums is afforded within a minimum amount of space.

It will thus be understood that the combined use of a tortuous path in a fluidizing device together with heat exchanging media, such as a bundle of tubes, within which a cooling fluid such as water is circulated, with the tubes being so arranged in each compartment so as to parallel the path of flow of the fluidized material, results in obtaining an extremely efficient fluidized cooler device while using a very small receptacle. The transfer of heat between the fluidized solid's bed and the fluidizing gas itself, as well as the bundle of tubes, is very high, because of the transfer of heat by convection with respect to the gas and by conduction between the particles and the metal walls of the tubes during innumerable contacts of the particles with the walls of the tubes. In short, the material to be cooled, such as calcined alumina, is afforded the maximum amount of exposure to cooling media within a minimum amount of space. Short circuiting of the material is effectively prevented and stratification of the fluidized material is controlled.

It will be obvious that various changes and modifications may be made in the instant invention without departing from the spirit or scope thereof as defined by the appended claims, wherein what is claimed is:

1. An apparatus for use in effecting heat transfer in a fluidized body of material comprising the combination of an elongated receptacle provided with an inlet and an outlet located at opposite ends of the receptacle, a plurality of individually controllable plenum chambers located in the bottom of said receptacle for fluidizing a body of pulverulent material introduced into the said receptacle and for causing said body of material to flow in a tortuous but generally axial uniform and continuous manner from said inlet to said outlet, a plurality of vertical baffles disposed within said receptacle in spaced parallel relationship to each other and effectively dividing the interior of said receptacle into a series of horizontally elongated individual fluidizing compartments, one of said plurality of individually controllable plenum chambers being associated with each of said horizontally elongated compartments, each of said baffles being provided with spaced cutaway portions at one of the extremities thereof and each of said baffles being so arranged within said receptacle that the cutaway portions on one of the baffles is located at the opposite end of the receptacle from the cutaway portions on the next adjacent baffle, whereby the compartments are brought into open communication with each other and a tortuous passage is formed in the receptacle from said inlet to the outlet, and separate individually controllable heat transfer media disposed within each of said compartments, each heat transfer media comprising a bundle of tubes extending lengthwise of the compartment and along a line parallel to the path of travel of the fluidized body of material in said compartment so as to allow free flow of the body of fluidized material to said compartment including a means carried by each of said baffles for adjusting the opening formed by said spaced cut-away sections in said baffles.

2. The combination as defined in claim 1 wherein said means for adjusting the opening formed by said spaced cut-away sections in said baffles comprises a vertically movable damper adjustably positioned with respect to each of said spaced cut-away portions of said baffles.

3. The combination as defined in claim 1 wherein each of said individually controllable plenum chambers includes a permeable means discharging a fluidizing medium perpendicularly to the path of flow of said fluidized material from said inlet to said outlet whereby even distribution of said fluidized material is obtained throughout said elongated receptacle.

4. The combination as defined in claim 2 wherein said elongated receptacle further includes a hood-like chamber disposed at the top of the receptacle, said chamber receiving the fluidizing medium after its passage vertically through said receptacle.

References Cited in the file of this patent

UNITED STATES PATENTS

| | | |
|---|---|---|
| 1,989,340 | Shepherd | Jan. 29, 1935 |
| 2,112,690 | Chapman | Mar. 29, 1938 |
| 2,467,741 | Hancock | Apr. 19, 1949 |
| 2,529,366 | Bauer | Nov. 7, 1950 |
| 2,610,842 | Schoenmakers et al. | Sept. 16, 1952 |
| 2,629,938 | Montgomery | Mar. 3, 1953 |
| 2,697,653 | Nicholson | Dec. 21, 1954 |